United States Patent [19]
Akkapeddi et al.

[11] Patent Number: 5,814,384
[45] Date of Patent: Sep. 29, 1998

[54] ARTICLES OF MANUFACTURE COMPRISING EXTRUDED POLYAMIDE-LOW DENSITY POLYETHYLENE GRAFT BLENDS

[75] Inventors: Murali K. Akkapeddi, Morristown; Sengshiu Chung, Parsippany; Michael P. May, Sparta, all of N.J.

[73] Assignee: AlliedSignal, Inc., Morris Township, N.J.

[21] Appl. No.: 764,165

[22] Filed: Dec. 13, 1996

Related U.S. Application Data

[63] Continuation of Ser. No. 500,025, Jul. 10, 1995, abandoned, which is a continuation of Ser. No. 262,127, Jun. 17, 1994, abandoned.

[51] Int. Cl.[6] ................................................. C08L 77/00
[52] U.S. Cl. ................. 428/35.7; 138/121; 138/122; 428/36.91; 525/66; 525/179
[58] Field of Search ................. 525/66, 179; 138/122, 138/121; 428/35.7, 36.91

[56] References Cited

U.S. PATENT DOCUMENTS

| | | | |
|---|---|---|---|
| 3,862,265 | 1/1975 | Steinkamp et al. | 260/878 |
| 4,147,740 | 4/1979 | Swiger et al. | 260/878 |
| 4,172,859 | 10/1979 | Epstein | 428/402 |
| 4,174,358 | 11/1979 | Epstein | 525/183 |
| 4,305,865 | 12/1981 | Okada et al. | 525/66 |
| 4,362,846 | 12/1982 | Korber et al. | 525/66 |
| 4,814,379 | 3/1989 | Flood et al. | 525/66 |
| 5,013,789 | 5/1991 | Sakuma et al. | 525/66 |
| 5,021,510 | 6/1991 | Vroomans | 525/285 |
| 5,264,262 | 11/1993 | Igarashi | 428/36.9 |

FOREIGN PATENT DOCUMENTS

A 94 13740  6/1994  WIPO.

OTHER PUBLICATIONS

"Compatibilized Blends of Polyamide–6 and Polyethylene" Poly. Eng. and Sci., Nov. 1992, vol. 32, No. 22.
"Toughened Nylon Resins" Poly. Eng. and Sci., May 1983, vol. 23, No. 7.

*Primary Examiner*—Ana Woodward
*Attorney, Agent, or Firm*—Colleen Szuch; Roger H. Criss

[57] ABSTRACT

An article of manufacture which has a high resistance to chemicals, solvents, and heat formed from a blend of (A) a polyamide, such as polycaprolactam; (B) a functionalized polyethylene, such as low density polyethylene; and (C) an unfunctionalized low density polyethylene. The blend has a melt viscosity suitable for extrusion into convoluted tubing, nonconvoluted tubing, sheets, films, and the like.

19 Claims, 4 Drawing Sheets

ARTICLES OF MANUFACTURE COMPRISING EXTRUDED POLYAMIDE-LOW DENSITY POLYETHYLENE GRAFT BLENDS

This application is a continuation of application Ser. No. 08/500,025 Filed Jul. 10, 1995 now abandoned which is a continuation of application Ser. No. 08/262,127 Filed Jun. 17, 1994, now abandoned.

BACKGROUND OF THE INVENTION

This invention relates to articles of manufacture comprising polyamide/low density polyethylene blends and the process for producing such articles. One specific aspect of this invention relates to extruded articles of manufacture including a polyamide, an unfunctionalized low density polyethylene, and a functionalized polyethylene.

Methods for producing polyethylene grafted with maleic anhydride (Steinkamp and Grail, U.S. Pat. No. 3,862,265; Swiger et al., U.S. Pat. No. 4,147,740) as well as processes for combining polyamides and polyolefins grafted with maleic anhydride into compositions suitable for injection molding (Epstein, U.S. Pat. Nos. 4,172,859 and 4,174,358) are known. In particular, compositions comprising nylon 6, functionalized high density polyethylene ("HDPE"), and unfunctionalized linear low density polyethylene ("LLDPE") as well as compositions comprising nylon 6,6 and functionalized low density polyethylene have been made as indicated in Padwa, 32 (22) Poly Eng Sci 1703–10 (1992) and Hobbs, et al, 23(7) Poly Eng Sci 380 (1983), respectively. Because these references are directed to modifying the impact properties of polyethylene/polyamide compositions, their teachings are restricted to blended compositions employing functionalized low density polyethylene at low concentrations per se without addressing the composition's flexibility, chemical and solvent resistance, or suitability for tubing, jacketing or sheathing applications. This is especially evidenced by the transmission electron micrographs ("TEM") disclosed in Padwa, which reveal that all of the blends disclosed therein consist of dispersed domains of nylon 6 within a continuous phase of both functionalized and unfunctionalized polyethylene. Although such blends consisting of a continuous phase of polyethylene may have the sufficient flexibility required for tubing applications, they lack other necessary properties, i.e. chemical and solvent resistance, which are desired in tubing and sheathing or jacketing applications.

To meet the growing demand in the automobile industry for extruded articles in the form of straight and convoluted or corrugated tubing, it would be desirable to have such articles comprised of a material having not only sufficient flexibility but also adequate resistance to chemicals, solvents, and heat.

SUMMARY OF THE INVENTION

We have discovered flexible articles of manufacture having a high heat resistance and solvent resistance, said article formed from a polymeric blend comprised of:
 (a) about 50 to about 80% by weight, based on the total weight of the blend, of at least one polyamide;
 (b) about 1 to about 50% by weight, based upon the total weight of the blend, of a functionalized polyethylene; and
 (c) about 0 to about 49% by weight, based on the total weight of the blend, of an unfunctionalized low density polyethylene ("LDPE").

As used herein "high heat resistance" is denoted by properties, such as a high softening temperature, i.e. VICAT softening temperature greater than about 200° C. "High solvent resistance", as used herein, refers to a solvent resistance imparted to the composition which is proportional to that of the polyamide present. More specifically, we have found that by adjusting the ratios of the three above-mentioned components accordingly, a polyamide-low density polyethylene blend composition of suitable viscosity can be extruded into various articles of manufacture having high chemical resistance and heat stability as well as superior flexibility.

BRIEF DESCRIPTION OF THE DRAWINGS

The invention will be more fully understood and further advantages will become apparent when reference is made to the following detailed description of the invention and the accompanying drawings in which.

DESCRIPTION OF THE PREFERRED EMBODIMENTS

Figure 1:
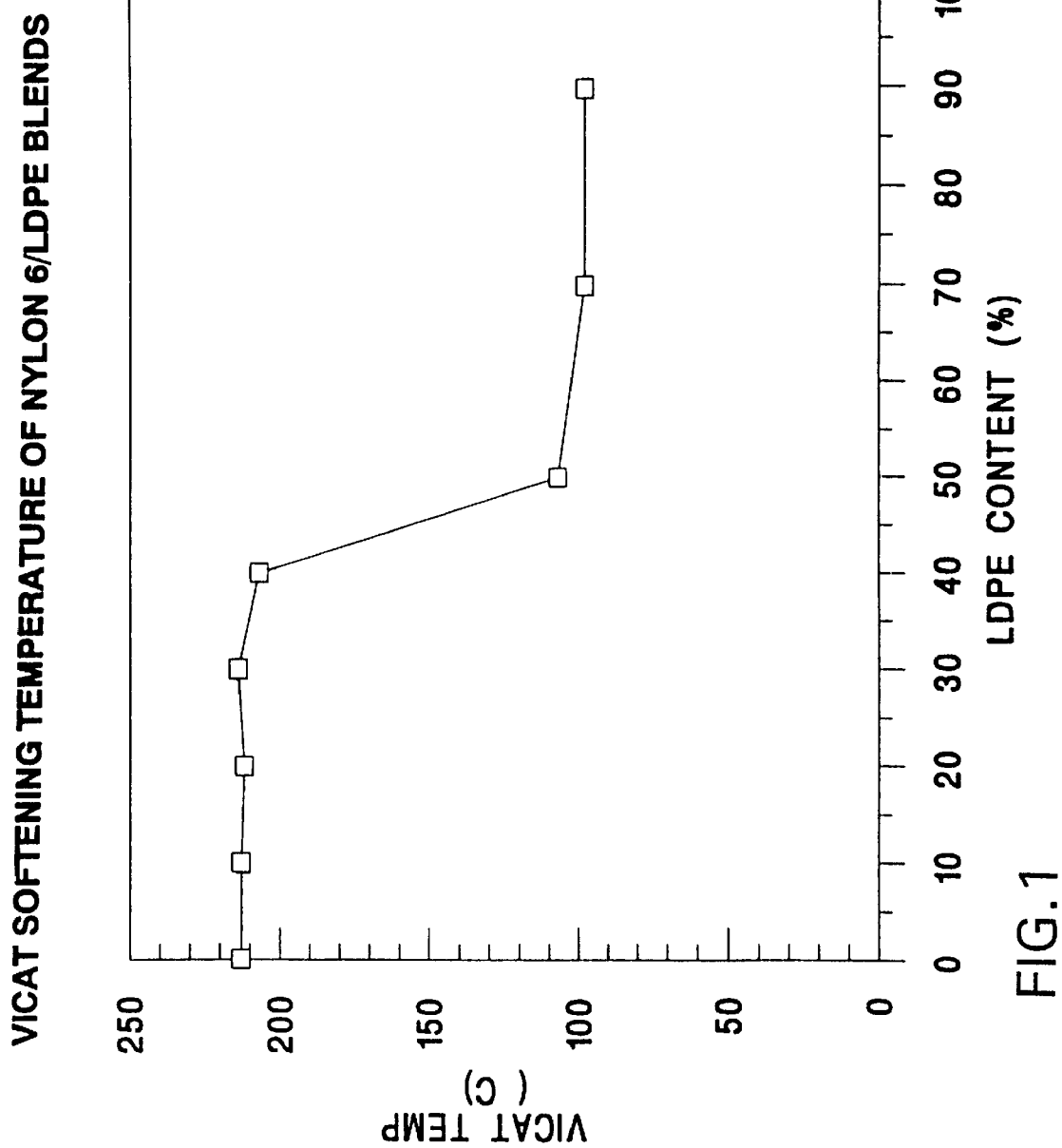
FIG. 1 is a graph illustrating the Vicat Softening Temperature of nylon 6/LDPE blends (° C.) versus LDPE content.

Unless otherwise indicated, all references herein are based upon weight. In addition, all values of melt index reported herein are in units of g/10 minutes at 235° C. and under a load of 1 kg, unless otherwise indicated.

The polyamides of component (a) are formed by the reaction of diamines and diacids such as poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(nonamethylene azelamide) (nylon 9,9), poly(decamethylene azelamide) (nylon 10,9), and the like. Also illustrative of useful aliphatic polyamides are those formed by polymerization of amino acids and derivatives thereof, as for example lactams. Illustrative of these useful polyamides are poly(4-aminobutyric acid) (nylon 4), poly(6-aminohexanoic acid) (nylon 6, also known as poly(caprolactam)), poly(7-aminoheptanoic acid) (nylon 7), poly(8-aminoocatanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like. Blends of two or more aliphatic polyamides may also be employed.

Copolymers formed from recurring units of the above referenced aliphatic polyamides can also be used. Such copolyamides can be aliphatic/aliphatic type or aliphatic/aromatic (semi-aromatic) type compounds. By way of illustration and not limitation, such aliphatic polyamide copolymers include caprolactam/hexamethylene adipamide copolymer (nylon 6/6,6), hexamethylene adipamide/caprolactam copolymer (nylon 6,6/6), hexamethylene adipamide/hexamethylene terephthalamide copolymer (nylon 6,6/6T), hexamethylene terephthalamide/isophthalamide (nylon 6T/6I), hexamethylene terephthalamide/caprolactam copolymer (nylon 6T/6) and the like. Nylon 6 is most preferred.

Polyamides suitable for use in this invention have a formic acid viscosity ("FAV") of about 30 to about 150, preferably about 40 to about 100, and most preferably about 45 to about 75, as well as a number average molecule weight, as measured by end group titration, of about 15,000 to 40,000. For convoluted tubing applications, the polyamide preferably has a FAV between about 55 to about 70.

Polyamides may be obtained from commercial sources or prepared in accordance with known preparatory techniques. For example, nylon 6 can be obtained from AlliedSignal Inc., Morristown, N.J. As commercially produced, nylon 6 contains about 10 weight % caprolactam. However, the lactam content of the nylon may vary between about 0 to about 10 weight % through selective extraction of the nylon or by the blending of washed and unwashed nylon. Unwashed polycaprolactam is preferred due to its low modulus.

Component (b) is a polyethylene containing a carboxylic acid or anhydride moiety. More specifically the polyethylene is functionalized with a compound selected from the group consisting of maleic anhydride, fumaric acid, methacrylic acid, acrylic acid, and the like and having a melt index of about 0.001 to about 20 at 190° C. and under a load of 2.16 kg, preferably about 0.01 to about 5, and most preferably about 0.04 to about 3. Other functionalizing compounds include maleic acid, itaconic acid, citric acid, itaconic anhydride, citraconic anhydride, and the like. The term "functionalized" as used herein means reactively attaching the functionalized compound to the polymer, i.e. polyethylene, backbone. Both maleic anhydride and acrylic acid are commercially available from Aldrich Chemical Co. The polyethylene of component (b) is selected from the group consisting of high density polyethylene, low density polyethylene, and linear low density polyethylene. Preferably, component (b) is a low density or linear low density polyethylene functionalized with maleic anhydride.

Component (b) may be synthesized by methods generally known in the art for the functionalization of polyolefins. While not being limited to any theory, it is believed that the maleic anhydride reacts with the polyethylene backbone via radical addition mechanism and thus becomes grafted thereto as a pendant succinic anhydride moiety. See U.S. Pat. No. 3,862,265 to Steinkamp, et al. and U.S. Pat. No. 4,147,740 to Swiger, et al.

Component (c), unfunctionalized low density polyethylene, is commercially available from Dow Chemical Co. The term "unfunctionalized" as used herein means a conventional unmodified polymer. The term "low density" as used herein means having a density between about 0.85 and about 0.95 g/cm$^3$. Low density polyethylene suitable for use in this invention has a melt index of about 0.5 to about 50 at 190° C. and under a load of 2.16 kg, preferably from about 1 to about 10, and most preferably from about 2 to about 5. For convoluted tubing applications, the unfunctionalized low density polyethylene preferably has a melt index of about 2.

The polyamide is present in the polymeric blend in an amount of from about 50 to about 80%, preferably from about 65 to about 80%, and most preferably about 70 to about 80%, based upon the total weight of the polymeric blend. The unfunctionalized low density polyethylene is present in an amount of from about 0 to about 49%, preferably from about 0 to about 30%, and most preferably from about 20 to about 30%, based upon the total weight of the polymeric blend. The functionalized polyethylene is present in an amount of from about 1 to about 50%, preferably from about 1 to about 30%, and most preferably from about 1 to about 10%, based upon the total weight of the polymeric blend. The amount of functionalized moiety in component (b) is about 0.1 to about 3%, preferably about 0.4 to about 2%, and most preferably about 0.8 to about 1.5%, based upon the total weight of the functionalized polyethylene.

Figure 4:
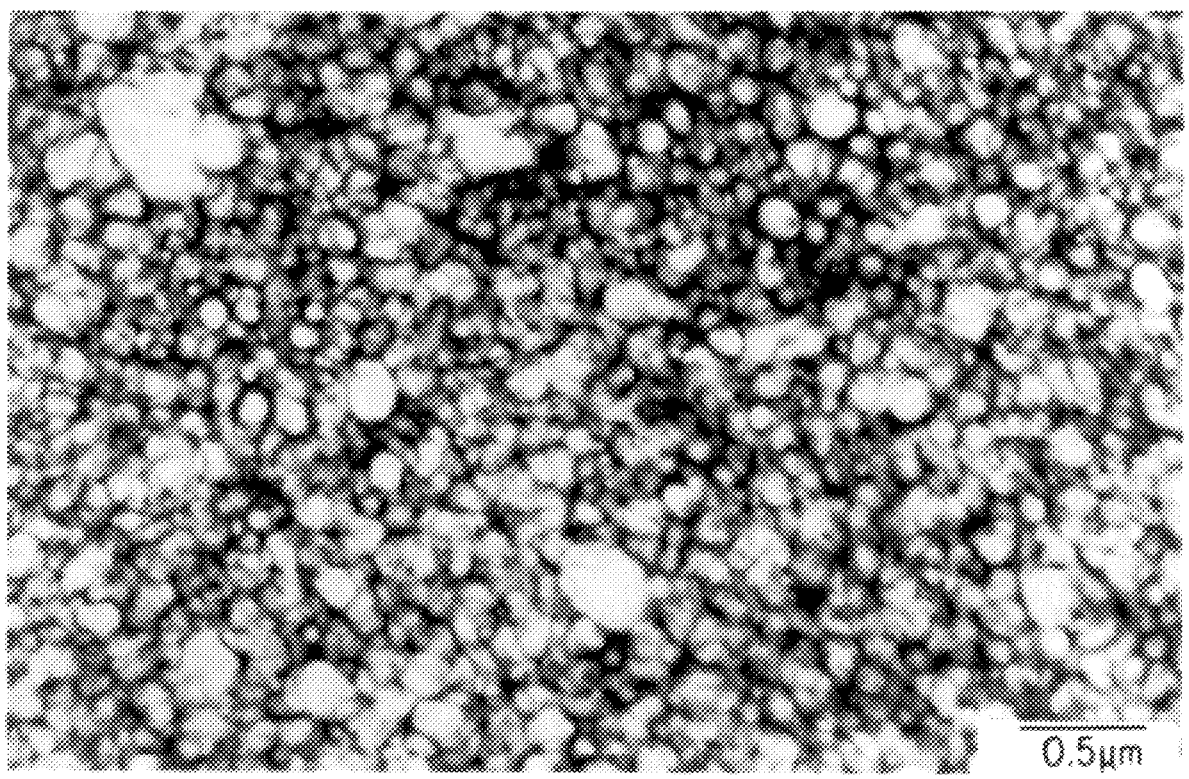
FIG. 4 is a TEM of a composition containing 60% by weight of nylon 6 and 40% by weight of maleated LDPE.

It is preferred that the ratio of component (a) to components (b) and (c) be about 60:40 to about 90:10. Most preferably, the ratio of component (a) to components (b) and (c) is about 70:30 to about 80:20. At these ratios, the functionalized and unfunctionalized polyethylene is dispersed within the continuous polyamide phase. This is illustrated in FIG. 4, in which the low density polyethylene, as shown by the light areas, is dispersed within the continuous nylon phase for a 60:40 nylon 6-maleated low density polyethylene blend composition.

Although the manufacture of nonconvoluted (straight) tubings, sheathings and jacketings permits a wider range of viscosity in the polyamide-polyethylene blend composition, i.e. acceptable melt index ranges between about 0.1 and about 20, we have found that by using polyamide having a FAV between about 50 to about 70 and a polyethylene having a melt flow index of about 2, and by increasing the polyamide ratio such that the polyethylene is dispersed within the continuous polyamide phase, we are able to create a polyamide-polyethylene blend composition having sufficient viscosity, i.e. a melt index between about 1 and about 5, and preferably between about 2 and about 3, which is extrudable into convoluted tubing articles.

Figure 3:
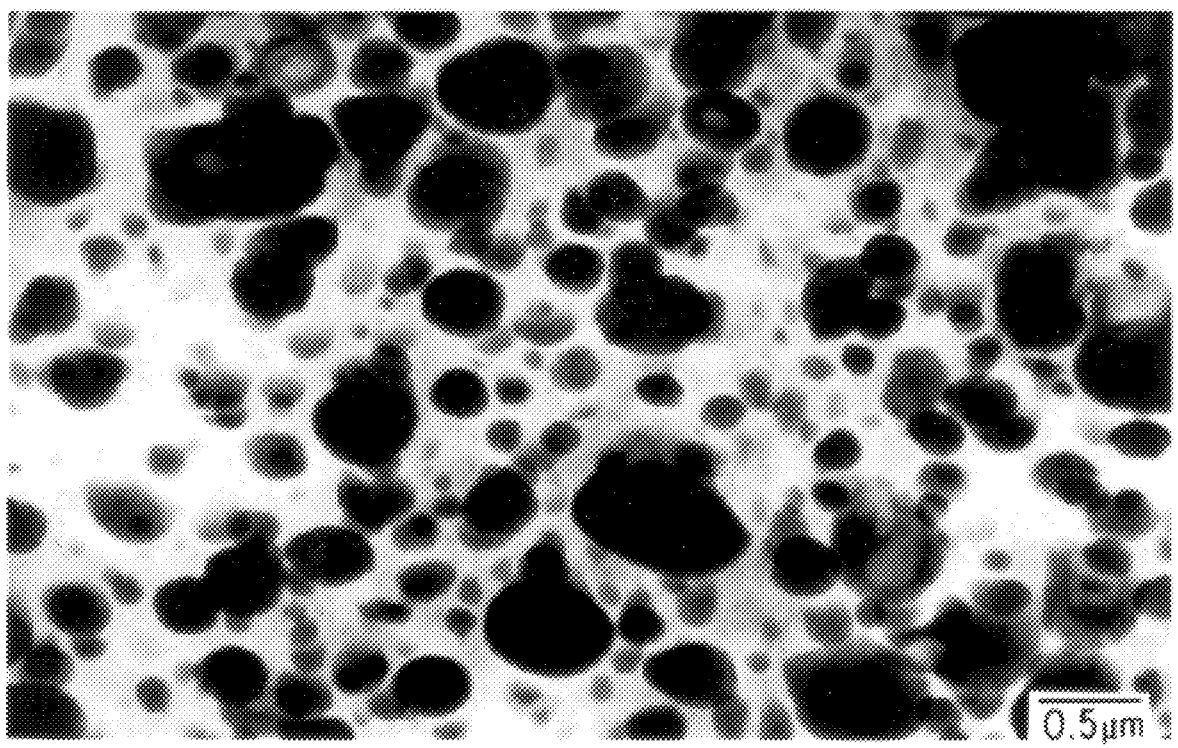
FIG. 3 is a TEM of a composition containing 40% by weight of nylon 6 and 60% by weight of maleated LDPE.

If the amount of nylon present in the polymeric blend is greater than about 80%, the resulting composition would be too stiff and would lack the requisite toughness for the articles of manufacture. By contrast, compositions containing less than about 50% nylon 6 are also unsuitable since at that amount the nylon 6 is dispersed within the low density polyethylene continuous phase, leading to low softening points and low chemical resistance. This is illustrated in FIG. 3, wherein the nylon, as shown by the dark areas, is dispersed within the continuous low density polyethylene phase for a 40:60 nylon 6-maleated low density polyethylene composition.

Methods for coupling functionalized polyolefins to polyamides to form compositions suitable for injection molding are generally known in the art. For example, polyolefins grafted with maleic anhydride may be dry-blended with polyamide, then extruded under vacuum at about 5° C. to about 100° C. above the melting point of the blended composition, preferably at 310° C. or below. See, e.g., U.S. Pat. No. 4,172,859 to Epstein, which is incorporated by reference.

The articles of manufacture of the present invention may be formed by initially combining a polyamide, an unfunctionalized polyethylene, and a functionalized polyethylene at the recommended ratios and viscosities. Then, the combination may be formed into various articles of manufacture by methods, such as extrusion, which are well-known in the art. Although the combination of the three components of the polymeric blend was known in the art, see, i.e., Padwa, the art did not elaborate upon the effects of each respective component's phase or viscosity on the overall blended composition's properties and stability. By adjusting the processing requirements, i.e. amounts of each component, to arrive at a suitable blend viscosity, we were able to exploit the properties and stability of such a blend in order to create various articles of manufacture having excellent flexibility, heat aging resistance, and resistance to chemicals and solvents.

More specifically, by extruding the polyamide and polyethylene components at a screw speed of about 100 to about 400, preferably about 200 to about 300, and a head pressure of about 1000 psi (6.90 MPa) to about 3000 psi (20.70 MPa), we have created a blended composition having a melt flow of about 0.1 to about 10, preferably about 1 to about 5, and most preferably from about 2 to about 3, which thus is a suitable viscosity for extrusion into both convoluted and non-convoluted tubings, sheathings and jacketings. This process is illustrated in more detail in the accompanying examples.

As used herein, the term "article" is broadly meant to encompass that which is formed, molded, extruded, blow-molded, coextruded, thermoformed, laminated, and the like from the melt blended composition as well as blends with other thermoplastics into any of a variety of sizes, shapes, thicknesses, and so forth, whether it be film, sheet, tubing, containers, bottles, cans, vessels, coextrusions, laminations, and the like.

The articles of manufacture can be single or multi-layered constructions. Such constructions include extruded materials such as cylindrical, convoluted or corrugated tubings which have utility in industrial and automotive applications, for example, windshield wiper tubing, wire and cable jacketing, fuel lines, vapor return lines, paint spray hoses, ducts, and the like. Typically, these tubes have inner diameters ranging between about 0.04 mm to about 40 mm.

In articles formed by coextruding, i.e. in the form of a multi-layer "tube", an outer layer comprised of the polyamide-polyethylene blend of the present invention may be bonded to a thermoplastic resin inner layer, with an optional tie layer therebetween. The inner thermoplastic layer may possess high barrier properties to hydrocarbons, such as gasoline and "gasohol", a mixture of gasoline and alcohol. Resins which are suitable for forming such coextruded articles in conjunction with the compositions of this invention may include one or more of the following: polyamides, such as poly (11-aminoundecanoic acid) ("nylon 11") and poly(laurolactam) ("nylon 12"), fluoroplastics, such as polyvinylidene fluoride and ethylene-tetrafluoroethylene copolymer, polyesters, such as polybutylene terephthalate and derivatives thereof, and the like and blends thereof. Preferred among these resins are fluoroplastics. Such multilayer coextruded tubings in which the fluoroplastics are used as the inner layer and the polyamide-polyethylene blend of this invention is used as the outer layer are particularly useful as fuel lines and vapor return lines in automobiles.

Molded containers can also be made from the above-described polymeric blend by compression molding, blow molding, thermoforming, vacuum molding, or other such techniques, all of which are conventional techniques.

Articles formed from the compositions of the invention are ideally suited for automotive and industrial applications which require the use of materials having a high heat resistance, high chemical or solvent resistance, and high flexibility. In addition to having a high resistance to chemicals, solvents, and heat as lended by the nylon component, the resulting articles of manufacture are also imparted with great flexibility resulting from the blending of polyethylene. However, since nylon and polyethylene are incompatible, use of the functionalized polyethylene component is essential.

The blends of this invention may also contain one or more conventional additives such as stabilizers and inhibitors of oxidative, thermal, and ultraviolet light degradation, lubricants and mold release agents, colorants, including dyes and pigments, flame-retardants, fibrous and particulate fillers and reinforcements, plasticizers, and the like. These additives are commonly added at mixing.

Representative oxidative and heat stabilizers which may be present in blends of the present invention include Group I metal halides, e.g., sodium, potassium lithium with cuprous halides, e.g., chloride, bromide, iodide,; hindered phenols, organophosphites, hydroquinones, and varieties of substituted members of those groups and combinations thereof.

Representative ultraviolet light stabilizers include various substituted resorcinols, salicylates, benzotriazoles, benzophenones, and the like.

Representative lubricants and mold release agents include stearic acid, stearyl alcohol, and stearamides. Representative organic dyes include nigrosine, while representative pigments include titanium dioxide, cadmium sulfide, cadmium selenide, phthalocyanines, ultramarine blue, carbon black, and the like. Representative fillers include carbon fibers, glass fibers, amorphous silica, asbestos, calcium silicate, aluminum silicate, magnesium carbonate, kaolin, chalk, powdered quartz, mica, feldspar, and the like.

Representative flame-retardants include organic halogenated compounds such as decabromodiphenyl ether and the like.

Representative plasticizers include lactams such as pyrrolidone, laurolactam, and caprolactam, sulfonamides such as o,p-toluenesulfonamide and N-ethyl, o,p-toluenesulfonamide and other plasticizers known in the art.

The present invention is more fully illustrated by the following non-limiting examples. As used in these Examples, "extracted nylon 6" means nylon 6 containing essentially no monomers, i.e., less than 0.5 percent, and "unextracted nylon 6" means nylon 6 containing approximately 8–10% of residual caprolactam monomer.

EXAMPLES

Several examples are set forth below to illustrate the nature of the invention and the manner of carrying it out.

The extruder used in Examples 1–5 is a Warner & Pfleiderer twin screw extruder having a 40 mm diameter and general purpose screws having a length:diameter ratio of 34.5 to 1.

Melt blended compositions in the following Examples were tested according to the following procedures unless indicated otherwise:

ASTM-D-256: Notched Izod at 23° C., 3/16 inch (5 mm) thick sample;

ASTM-D-790: Flexural Strength and Modulus;

ASTM-D-638: Tensile Strength, Modulus and Elongation;

ASTM-D-2839 Melt Index; and

ASTM-D-1525: Vicat Softening

Example 1

Preparation of Maleated Low Density Polyethylene

Into the throat of the extruder, 100 parts of a low density polyethylene, 1 part of maleic anhydride produced by Aldrich Chemical Company, and 0.3 parts of a peroxide initiator, viz. 2,5-Dimethyl-2,5(t-butyl peroxy)hexyne-3, produced by Atochem America under the tradename, "Luperco-130 LX" were fed at a rate of 100 pounds/hr (45.3 kg/hr) and melt-blended.

The low density polyethylene had a density of about 0.92, and a melt index of 2.0, and was produced by Dow Chemical Company under the tradename, "DOW-640".

The temperature profile in the extruder was as follows: Zones 1 through 6 at 190° C., and Zones 7 through 10 as well as the die at 200° C. The operating conditions of the extruder included a screw speed of 100 rpm, a motor drive amperage of 90 amps, a melt temperature in the die of about 205° C. to about 220° C., and an extruder output of 100 pounds/hour (45.3 kg/hour).

A vacuum was applied at Zone 9 to remove the unreacted maleic anhydride. The pressure in the other zones of the extruder was 1120 psi (7,720 KPa).

The maleated low density polyethylene produced was functionalized with an efficiency of greater than or equal to 70 percent.

Examples 2–3

Preparation of Nylon 6-Maleated Low Density Polyethylene Blends

Maleated low density polyethylene produced in Example 1 and a polyolefin antioxidant comprised of 4,4' di(α,α-dimethyl benzyl) diphenylamine and obtained from Uniroyal Chemical Company, Inc. under the tradename "Naugard-445", were fed into the throat the extruder at a rate of 35.6 lb/hr (16.1 kg/hr) and melt-blended.

The temperature profile in the extruder was as follows: Zone 1 at 200° C., Zone 2 at 230° C., Zones 3 through 10 at 260° C., and the die at 260° C. The operating conditions of the extruder included a screw speed of 225 rpm, a motor drive amperage of about 60 to about 90 amps, a melt temperature in the die of about 270 ° C. to about 280° C., and an extruder output of 90 pounds/hour (40.8 kg/hour).

A vacuum of 200 mmHg was applied at Zone 4 for the purpose of removing the unreacted maleic anhydride. A vacuum of 200 mmHg was also applied at Zone 9 for the same purpose. The pressure in all other zones of the extruder was 700 psi (4,800 KPa).

A mixture of unextracted nylon 6 having a formic acid viscosity of 70, extracted nylon 6 having a formic acid viscosity of 45, carbon black obtained from Southwest Chemical Services, and nylon heat stabilizer obtained from AlliedSignal Inc., were added at Zone 6. The nylon heat stabilizer is comprised of 74.8% nylon, 23% potassium bromide, and 2.2% of a mixture further comprised of cuprous iodide and magnesium stearate in a ratio of about 98.5:1.5.

The extracted and unextracted nylon 6 was obtained from AlliedSignal Inc.

The blend of nylon 6, and maleated low density polyethylene had a melt flow index of about 0.1 to about 0.5 g per 10 minutes at a load of 2.16 kg at 245° C.

Examples 4–5

Preparation of Nylon 6-Maleated Low Density Polyethylene—Polyethylene Blends

Low density polyethylene obtained from Dow Chemical Company under the tradename "DOW-640" and both the maleated low density polyethylene and polyolefin antioxidant of Example 1 were fed into the throat of the extruder at a rate of 100 lb/hr (45.3 kg/hr) and melt-blended.

The temperature profile in the extruder was as follows: Zone 1 at 200° C., Zone 2 at 230° C., Zones 3 through 10 at 260° C., and the die at 260° C. The operating conditions of the extruder included a screw speed of 300–450 rpm, a motor drive amperage of 60 to 100 amps, a melt temperature in the die of about 270° C. to about 300° C., and an extruder output of 200 pounds/hour (90.6 kg/hour). The pressure in all zones of the extruder was about 500 to about 800 psi (about 3.5 to about 5.5 MPa).

A mixture of unextracted nylon 6 having a formic acid viscosity of 70, extracted nylon 6 having a formic acid viscosity of 45, carbon black obtained from Southwest Chemical Services, and the nylon heat stabilizer of Examples 2–3 were added at Zone 6.

The extracted and unextracted nylon 6 was obtained from AlliedSignal Inc.

The blend of nylon 6, maleated low density polyethylene, and low density polyethylene had a melt flow index of about 2 to about 3.

The contents of the compositions prepared according to the procedures described above are set forth in Table I. All parts were based upon the total amount of material fed to the throat of the extruder.

TABLE 1

Blending Conditions For Nylon 6-Maleated LDPE Blends

|  | Ex. 2 | Ex. 3 | Ex. 4 | Ex. 5 |
|---|---|---|---|---|
| Unextracted Nylon 6 | 48.75 | 30 | 48.75 | 48.75 |
| Extracted Nylon 6 | 16.25 | 30 | 16.25 | 16.25 |
| Heat Stabilizer | 0.75 | 0.75 | 0.75 | 0.75 |
| Carbon Black | 0.6 | 0.6 | 0.6 | 0.6 |
| Maleated LDPE (Ex. 1) | 35 | 40 | 5.25 | 5.25 |
| LDPE | 0 | 0 | 29.75 | 29.75 |
| Antioxidant | 0.6 | 0.6 | 0.6 | 0.6 |

The blends of Examples 2–5 were injection molded on a 25 ton Arburg Injection Molder into test bars. Bars (flex bars) for testing flexural properties were ⅛ inches (3.175 mm) thick, tensile bars were ⅛ inch (3.175 mm) thick. Izod testing was conducted on the flex bars. Typical molding conditions follow: Zone temperatures 1 to 3 of about 260° C.; mold temperature of about 180° C., with about 400 to about 1,000 psi (about 2.8 to about 6.9 MPa) psi pressures and cycle times of about 20 to about 40 seconds. Tables 2–5 below illustrate the mechanical properties of injection molded bars comprised of the blend compositions of Examples 2–5.

TABLE 2

Properties of Nylon 6-Low Density Polyethylene Blends (Dried-As-Molded)

| Mechanical Properties | Ex. 2 | Ex. 3 | Ex. 4 | Ex. 5 |
|---|---|---|---|---|
| Tensile Strength, psi | 6,800 | 7,000 | 4,200 | 5,500 |
| (MPa) | (46.8) | (48.2) | (28.9) | (37.9) |
| Yield Strength, psi | 5,400 | 6,300 | 4,400 | 4,900 |
| (MPa) | (37.2) | (43.4) | (30.3) | (33.8) |
| Elongation to break, % | 180 | 180 | 250 | 260 |
| Flex Strength, psi | 6,100 | 6,500 | 5,100 | 5,800 |
| (MPa) | (42.1) | (44.8) | (35.1) | (40.0) |
| Flex modulus, psi | 133,000 | 157,000 | 121,000 | 138,000 |
| (MPa) | (916) | (1.081) | (834) | (951) |
| Notched Izod, (23° C.) | 3.1 | 6.5 | 2 | 2 |
| ft-lb/in notch (J/M) | (165.2) | (346.3) | (106.6) | (106.6) |

TABLE 3

Properties of Nylon 6-LDPE Blends
(Heat Aged at 150° C. for 1 Day)

| Mechanical Properties | Ex. 2 | Ex. 3 | Ex. 4 | Ex. 5 |
|---|---|---|---|---|
| Tensile strength, psi (MPa) | 6,800 (46.8) | 6,900 (47.5) | 4,900 (33.8) | 5,100 (35.1) |
| Elongation-at-break, % | 155 | 165 | 140 | 74 |
| Flex Strength, psi (MPa) | 7,100 (48.9) | 7,300 (50.3) | | |
| Flex modulus, psi (MPa) | 186,000 (1,282) | 185,000 (1,275) | | |

TABLE 4

Properties of Nylon 6-LDPE Blends
Heat Aged at 150° C. for 7 Days)

| Mechanical Properties | Ex. 2 | Ex. 3 | Ex. 4 | Ex. 5 |
|---|---|---|---|---|
| Tensile Strength, psi (MPa) | 6,300 (43.4) | 6,200 (42.7) | 5,300 (36.5) | 6,200 (42.7) |
| Elongation-to-break, (%) | 60 | 90 | 50 | 40 |
| Flex Strength, psi (MPa) | 7,900 (54.4) | 7,800 (53.7) | 8,900 (61.3) | 8,000 (55.1) |
| Flex modulus, psi (MPa) | 200,000 (1,378) | 188,000 (1,295) | 163,000 (1,123) | 193,000 (1,330) |

TABLE 5

Properties of Nylon 6-LDPE Blends
(Heat Aged at 150° C. for 21 Days)

| Mechanical Properties | Ex. 2 | Ex. 3 | Ex. 4 | Ex. 5 |
|---|---|---|---|---|
| Tensile Strength, (180° C., 7 day) psi ((MPa) | 6,400 (44.1) | 610,000 (42.0) | | |
| Elongation-to-break, (180° C., 7 day), % | 50 | 50 | | |
| Flex Strength, (180° C., 7 day) psi (MPa) | 8,700 (59.9) | 8,000 (55.1) | | |
| Flex modulus, (180° C., 7 day) psi (MPa) | 220,000 (1516) | 196,000 (1350) | | |

Figure 2:
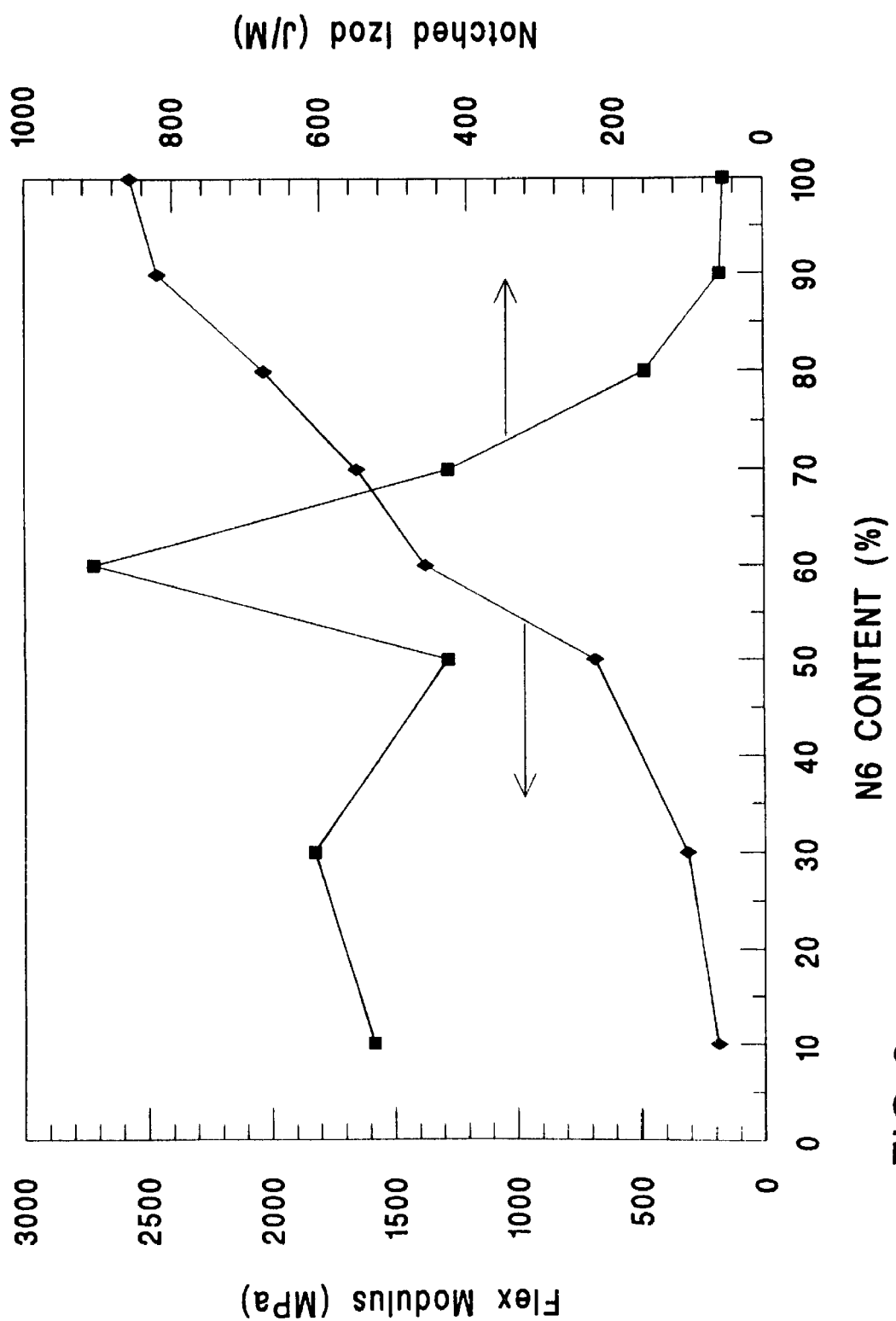
FIG. 2 is a graph illustrating the flexural modulus (MPa) and notched izod (J/M) versus LDPE content.

As illustrated above, the nylon 6-polyethylene-maleated low density polyethylene blend displays a high impact strength, i.e. notched Izod of greater than 2 ftlbs/in (107 J/m), low flexural modulus, i.e. less than 200,000 psi (1,378 MPa), see FIG. 2, high softening temperatures, i.e. less than 210° C., see FIG. 1, high melt strength, i.e. extruded tubes produced herein have uniform diameter and thickness, and good heat aging resistance, i.e. retention of high tensile elongations to break. However, the two-component composition is highly viscous, as illustrated by its melt index of less than about 0.2 g/10 min at 245° C. under a load of 2.16 kg/hr, which makes it suitable only for straight, nonconvolute applications. Although the composition of Examples 4 and 5 possesses lower values overall for mechanical properties, it advantageously possesses a viscosity that is low enough for convoluted tubing extrusions but yet high enough to withstand the rigors associated with tubing extrusion processes, i.e. melt index of between 1.2 and 1.4. Therefore, if the polymeric blend does not contain unfunctionalized polyethylene, then the extrudate therefrom is too viscous for use in convolute tubing applications.

Tables 2–5 report the mechanical properties of nylon 6-low density polyethylene blend samples which were injection molded. By contrast, the claimed articles of the invention are preferably extruded. Because the reduced shear rates normally encountered during the extrusion process are likely to contribute to the more stable morphology of an extruded article in comparison to that of an injection molded article, we believe that the properties of the extruded articles of manufacture are superior to those of the injection molded articles as illustrated in Tables 2–5.

Examples 6 through 9 were performed to identify the processing characteristics of extruding Nylon 6-Polyethylene blends into tubing. In these examples, all materials were processed on a Royal Extruder Model No. 2-W having a 2.5 inch (63.29 mm) screw, a length to diameter ratio of 24:1, a compression ratio of 4.0:1, and the following melt temperature profiles: Zone 10—430° F., Zone 9—440° F., Zone 8—450° F., Zone 7—450° F., Zone 6—450° F., Rear Flange Zone 5—450° F., Front Flange Zone 4—460° F., Velocity Section Zone 3—460° F., Head Zone 2—460° C., Die Zone 1—460° F., and a melt temperature of 475° F., which corresponds to 221, 226, 232, 232, 232, 232, 237, 237, 237, 237 and 246° C., respectively.

Example 6

Process for Extruding Nylon 6-PE Blend into Tubing

The nylon 6-polyethylene blend of Example 2, having a melt flow of about 0.15–0.2 g/10 minutes under a load of 2.16 kg and at 245° C., was fed into the hopper of the extruder. The operating conditions of the extruder included a screw speed of about 10 to about 60 rpm, primarily about 20 rpm, a motor drive amperage of about 10 to about 20 amps, a load of about 10 to about 15%, head pressure of about 1000 to about 3000 psi (about 6.90 to about 20.70 MPa), preferably about 2000 psi (13.80 MPa) and an extruder output of about 10 to about 45 feet per minute ( about 2.5 to about 15 meters per minute).

The tooling of the extruder included a die and a pin that provided a tube having a 0.312 inch (7.93 mm) outer diameter. Specifically, a pin having an outer diameter of 0.205 inches (5.2 mm) concentrically-surrounded by a die having an inner diameter of 0.375 inches (9.52 mm), an annular opening of 0.085 inches (2.17 mm), and a 20/40/60 screen pack therein was used.

After the material exited from the die, it entered a quench tank of about 20 to about 30 feet (about 6 to about 9 m) in length, which contained water at a quench temperature of about 75° F. (23.86° C.), and remained therein for about 2 to about 3 minutes. While in the quench tank, the extruded tube passed around a sizing plate having a diameter of 0.330 inches (8.36 mm).

The extruded tubing product had an outer diameter of 0.312 inches (7.93 mm) and a wall thickness of 0.031 inches (0.79 mm).

Example 7

Process for Extruding Nylon 6-PE Blend into Tubing

The process as described in Example 6 was performed with the blend of Example 3, which had a melt flow of about 0.05 to about 0.1 g/10 minutes under a load of 2.16 kg and at 245° C.

The extruded tubing product also had an outer diameter of 0.312 inches (7.93 mm) and a wall thickness of 0.031 inches (0.031 mm).

It can be seen that compositions comprised of a polyamide and a maleated polyethylene can be extruded through dies having an appropriately-sized annular opening in order to produce tubing having an inner diameter suitable for straight tubing applications. It can also be seen that the head pressure within the extruder is within what we believe to be the preferred operating range, i.e. less than about 7000 psi (48.27 MPa) and more preferably less than 3000 psi (20.70 MPa), in the art of straight tubing applications. At pressures above about 7000 psi (48.27 MPa), we believe that the operating risks associated with extrusions at such high pressures become unacceptably great.

Example 8

Process for Extruding Nylon 6-PE-Maleated PE Blend into Tubing

The process described in Example 6 was performed with the blend of Example 4, which had a melt flow of about 1.2. In place of the tooling having the dimensions as described in Example 6, the tooling included a die having an inner diameter of 0.457 inches (11.63 mm) and an annular opening of 0.041 inches (1.06 mm) as well as a pin having an outer diameter of 0.375 inches (9.51 mm) were used.

The extruded tubing product has an outer diameter of 0.312 inches (7.93 mm) and a wall thickness of 0.031 inches (0.79 mm).

Three additional runs of the process of Example 6 as modified above were also performed at different screw speeds: 60 rpm, 40 rpm, and 10 rpm, respectively. As the screw speeds were reduced, the head pressure also decreased from 2300 psi (15.86 MPa), to 1800 psi (12.41 MPa), to 1080 psi (7.41 MPa). The final tubing product retained its outer diameter and wall thickness.

Example 9

Process for Extruding Nylon 6-PE-Maleated PE Blend into Tubing

The process described in Example 6 was performed with the blend of Example 5, which had a melt flow of about 1.4. In place of the tooling having the dimensions as described in Example 6, the tooling described in Example 8 was used.

The extruded tubing product has an outer diameter of 0.312 inches (7.93 mm) and a wall thickness of 0.031 inches (0.79 mm).

Three additional runs of the process of Example 6 as modified above were also performed at different screw speeds: 60 rpm, 40 rpm, and 10 rpm, respectively. As the screw speeds were reduced, the head pressure also decreased from 2300 psi (15.86 MPa), to 2150 psi (14.78 MPa), to 1180 psi (8.135 MPa). The final tubing product retained its outer diameter and wall thickness.

It can be seen from Examples 8 and 9 that as a result of the lower melt viscosity of the three component polymeric blend, the blend can be extruded through a die having a smaller inner annular opening, i.e. 1.06 mm, than the inner annular opening of the die used with the two component composition in Examples 6 and 7, i.e. 2.17 mm, as well as at a head pressure within the range of what we believe to be acceptable for both straight and convolute tubing applications, i.e. less than about 7,000 psi (about 48.27 MPa), and more preferably less than about 3,000 psi ( about 20.70 MPa). The smaller annular opening of the die used in Examples 8 and 9 enables the blend to be extruded into a tube having a diameter suitable for convolute tubing applications.

Further, by varying the speeds of the extruder screws used in Examples 8 and 9, it is evident that the extrusion of the three component blend may occur at speeds which we believe are preferred in the convolute tube industry, i.e. about 40 rpm, without significantly increasing the head pressure to a value without the preferred safety range.

However, since the highly viscous, two component compositions of Examples 6 and 7 already incurred a head pressure near about 3000 psi (about 20.70 MPa) when the screws were run at about 20 rpm, it is unlikely that an increase to the preferred speeds would occur without also causing an increase in the head pressure to values well above the preferred range. It is likewise unfavorable to reduce the inner annular opening of the die in Examples 6 and 7 to values low enough for convoluted tubing applications in view of the fact that such a reduction would render the extrusion more difficult and thus would contribute to an increase in head pressure within the extruder.

What is claimed is:

1. A flexible, extruded article having high heat resistance and solvent resistance, said article formed from a polymeric blend comprised of:
   (a) about 50 to about 80% by weight, based upon the total weight of the blend, of at least one polyamide;
   (b) about 1 to about 50% by weight, based upon the total weight of the blend, of a low density polyethylene functionalized with a moiety selected from the group consisting of a carboxylic acid and an anhydride; and
   (c) about 20 to about 49% by weight, based upon the total weight of the blend, of an unfunctionalized low density polyethylene having a density between about 0.85 and about 0.95 g/cm$^3$, wherein said blend has a melt index between about 1 and about 5 g/10 minutes at 235° C. under a load of 1 kg.

2. The article of manufacture of claim 1, wherein said moiety is selected from the group consisting of maleic anhydride, fumaric acid, methacrylic acid, and acrylic acid.

3. The article of manufacture of claim 1, wherein the functionalized low density polyethylene contains about 0.1 to about 3% by weight, based upon the total weight of the functionalized polyethylene, of said moiety.

4. The article of manufacture of claim 1, wherein the functionalized low density polyethylene contains about 0.8 to about 1.5% by weight, based upon the total weight of the functionalized low density polyethylene, of said moiety.

5. The article of manufacture of claim 1, wherein said polyamide is polycaprolactam.

6. The article of manufacture of claim 1, wherein said polyamide has a formic acid viscosity of between about 30 to about 150.

7. The article of manufacture of claim 6, wherein said polyamide has a formic acid viscosity of between about 55 to about 70.

8. The article of manufacture of claim 1, wherein said unfunctionalized low density polyethylene has a melt index of about 0.5 to about 50 g/10 minutes at 190° C. and under a load of 2.16 kg.

9. The article of manufacture of claim 8, wherein said unfunctionalized low density polyethylene has a melt index of about 2 to about 5 g/10 minutes at 190° C. and under a load of 2.16 kg.

10. The article of manufacture of claim 1, wherein said functionalized low density polyethylene has a melt index of about 0.001 to about 5 g/10 minutes at 190° C. and under a load of 2.16 kg.

11. The article of manufacture of claim 10, wherein said functionalized low density polyethylene has a melt index of about 0.04 to about 3 g/10 minutes at 190° C. and under a load of 2.16 kg.

12. The article of manufacture of claim 1, wherein the blend contains about 60 to about 80 weight percent, based upon the total weight of the blend, of polyamide and about 10 to about 40 weight percent, based upon the total weight of the blend, of low density polyethylene and functionalized low density polyethylene.

13. The article of manufacture of claim 1, wherein the blend has a melt index of about 0.1 to about 10 g/10 minutes at 235° C. and under a load of 1 kg.

14. The article of manufacture of claim 13, wherein the blend has a melt index of about 1 to about 5 g/10 minutes at 235° C. and under a load of 1 kg.

15. The article of manufacture of claim 13, wherein said article is in the form of a straight, convoluted, or corrugated tube.

16. The article of manufacture of claim 15, wherein said tube has an inner diameter ranging between about 0.04 mm and about 40 mm.

17. The article of manufacture of claim 15, wherein said article is in the form of a multi-layer tube.

18. The article of manufacture of claim 17, wherein said tube has an outer layer comprised of said blend and an inner layer comprised of a thermoplastic resin selected from the group consisting of nylon 11, nylon 12, fluoroplastics, and combinations thereof.

19. A flexible, extruded article of manufacture having a high resistance to chemicals, solvents and heat, said article formed from a blend comprised of:

(a) about 70 to about 80% by weight, based upon the total weight of the blend, of at least one polyamide;

(b) about 1 to about 10% by weight, based upon the total weight of the blend, of a functionalized low density polyethylene said functionalized low density polyethylene containing about 0.8 to about 1.5% by weight, based upon the total weight of the functionalized low density polyethylene, of maleic anhydride; and (c) about 20 to about 30% by weight, based upon the total weight of the blend, of unfunctionalized low density polyethylene having a density between about 0.85 and about 0.95 g/cm$^3$, wherein said blend has a melt index of between about 2 and about 3 g/10 minutes at 235° C. and under a load of 1 kg.

* * * * *